Patented July 15, 1924.

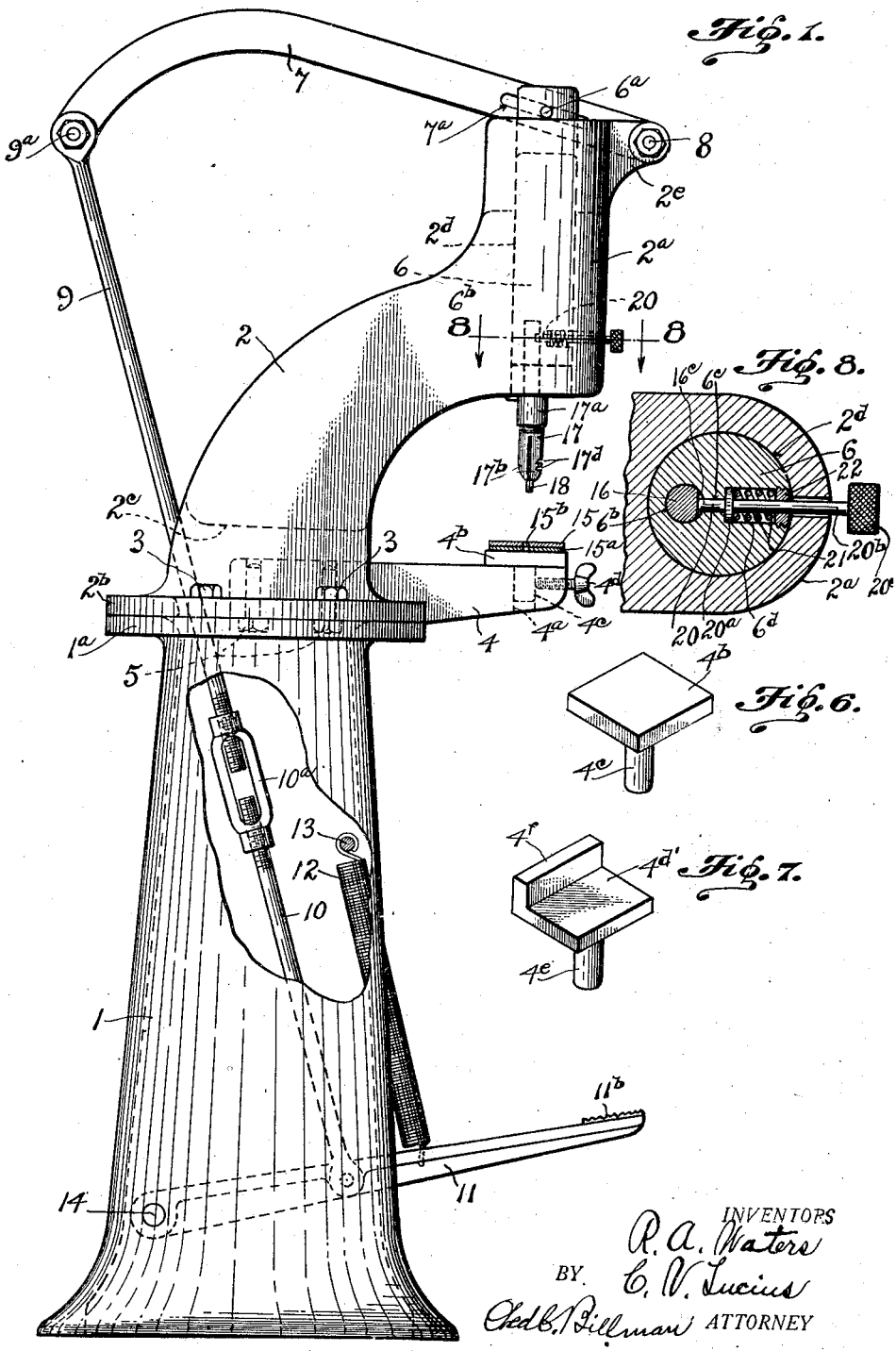

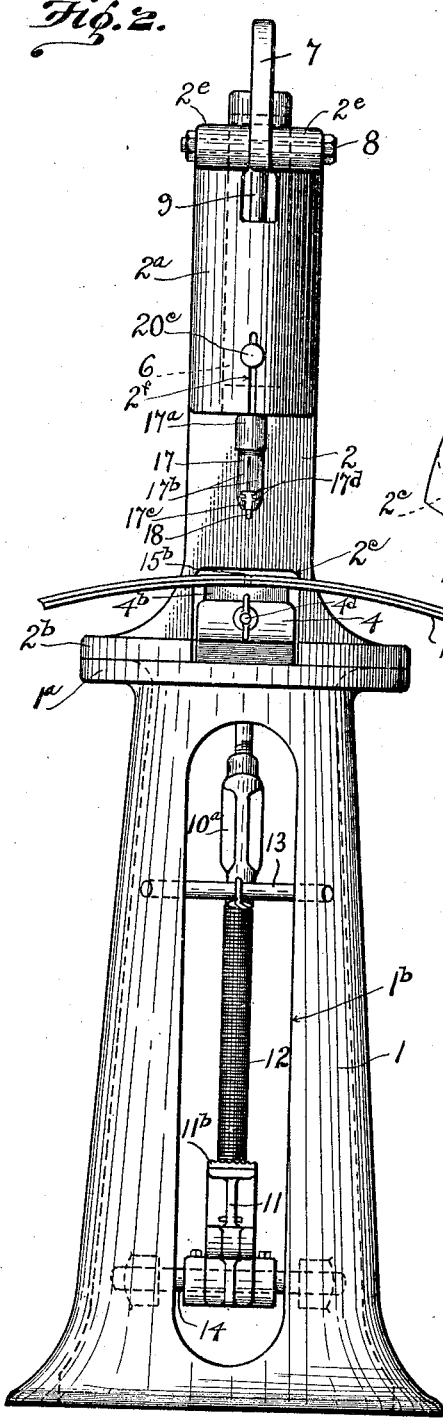

1,501,079

UNITED STATES PATENT OFFICE.

ROBERT A. WATERS AND CHRISTIAN V. LUCIUS, OF CANTON, OHIO.

BRAKE-RELINING MACHINE.

Application filed June 29, 1921. Serial No. 481,234.

*To all whom it may concern:*

Be it known that we, ROBERT A. WATERS and CHRISTIAN V. LUCIUS, citizens of the United States, and residents of Canton, in the county of Stark and State of Ohio, have invented certain new and useful Improvements in Brake-Relining Machines, of which the following is a specification.

Our invention relates to improvements in brake relining machines, the present embodiment of the invention being particularly designed and adapted for use in the removal of old brake linings from the brake bands of ordinary motor vehicles and the insertion of a new lining and reattaching the same through the medium of suitable rivets.

In carrying out the invention, suitable means are therefore provided for holding the old brake band and removing the lining therefrom by cutting the old rivets, and after the removal of such old lining and rivets, suitable means, including a removable anvil block and a reciprocatory plunger carrying a suitable rivet inserting device are provided for holding the old brake band and the new lining and reriveting the same.

The primary object of the invention is to provide a generally improved brake relining machine or device of the class indicated, which will be exceedingly simple in construction, cheap of manufacture, and efficient in use.

A further and very important object is the provision of suitable removable anvil blocks, and tools adapted to be mounted in the reciprocatory plunger to cooperate with the anvil blocks and brake band and lining to be operated upon, whereby the old lining and rivets may be readily removed and a new lining with the new rivets readily attached.

With the above mentioned and other ends in view, the invention consists in the novel construction, arrangement, and combination of parts, hereinafter described, illustrated in some of its embodiments in the accompanying drawings and particularly pointed out in the appended claims.

Referring to the drawings, forming a part of this specification, Figure 1, is a side elevation of a brake lining machine constructed in accordance with this invention, the plunger being equipped with a rivet inserting tool preparatory to inserting a new rivet in the brake band and new lining.

Fig. 2, a front elevation of the same.

Fig. 3, a fragmentary side elevation of the head and anvil portion equipped with removable tool and anvil block members arranged to remove the old lining and rivets preparatory to the relining operation.

Fig. 4, an enlarged detailed view of the rivet inserting tool, detached, the surrounding casing or sleeve being shown in section and the dotted lines indicating the relative position of the parts when the rivet is being held by the spring arms during the initial insertion of the rivet and preparatory to the final upsetting of the latter upon the anvil.

Fig. 5, a side elevation of the same.

Fig. 6, a perspective view of the rivet upsetting anvil block, detached.

Fig. 7, a similar view of the removable anvil block for holding the brake band and old lining preparatory to the removal of the lining by the lining and rivet removing tool as illustrated in Fig. 3, of the drawings.

Fig. 8, an enlarged cross sectional view of the plunger guide head and plunger, taken on line 8—8 of Fig. 1, and illustrating in particular the latching or locking mechanism for quickly attaching and detaching the tools in the plunger.

Similar numerals of reference designate like parts throughout all the figures of the drawings.

The improved machine comprises a suitable supporting pedestal 1, provided with a detachable head comprising, in the present instance, a curved arm 2, terminating in a plunger guide head 2ª. The pedestal 1, is preferably provided at its top with a flanged portion 1ª, and the curved arm 2, preferably terminates in a similarly shaped flanged base 2ᵇ, by means of which the head may be attached to the flanged portion 1ª, of the pedestal 1, by means of attaching bolts 3. The base portion of the arm 2, is provided with a recess 2ᶜ, (see Fig. 2) adapted to removably receive and contain an anvil 4, in the present instance, in the specific form of an anvil arm extending outwardly beneath the overhanging guide head 2ª, and secured by means of the attaching bolts 5.

As a means of operating a suitable tool in cooperative relation to the anvil 4, or the anvil block carried thereby, the guide head 2ª, is provided with a suitably arranged vertically extending guide opening 2ᵈ, adapted to receive and contain a suitable plunger 6, said plunger 6, being provided at its top with a recess and a suitable cross pin 6ᵃ, the latter being adapted to slide within a slot 7ᵃ, of a suitable operating lever 7, the latter being pivoted at its front end to suitable bearing lugs 2ᵉ, by means of a bearing bolt 8. The plunger operating lever 7, extends rearwardly and is connected at its rear end to a link member 9, by means of a connecting bolt 9ᵃ, and as a means of varying or adjusting the length of the stroke imparted to the tool relative to the anvil by means of the plunger 6, the link 9, is adjustably connected to a second link 10, by means of a turn buckle 10ᵃ, the second link 10, in the present instance, being connected to an operating foot lever 11, the latter extending forwardly through a slot opening 1ᵇ, in the pedestal 1, and terminating in a foot treadle 11ᵇ. As a means of returning the parts to their original elevated or initial position the foot lever 11, is connected to a coiled expansion spring 12, the latter being connected at its upper end to a cross pin 13, the rear end of the operating lever 11, being pivoted on a cross pin 14, in the base portion of the foot of the pedestal.

As a means of adapting the anvil to the work as well as to the particular form of tool carried by and actuated by the plunger the anvil 4, is preferably provided with a vertically extending opening or recess 4ᵃ, adapted to removably receive and contain a shank of similar form to fit therein and provided on the lower portion of the removable anvil block to be now described.

As a means of supporting a new lining 15ᵃ, on a brake band 15, preparatory to inserting a rivet in the rivet receiving opening 15ᵇ, a suitable block 4ᵇ is provided, said block 4ᵇ, being provided with a shank 4ᶜ, adapted to fit in the vertical opening 4ᵃ, of the anvil arm and to be clamped therein by means of the clamping screw 4ᵈ.

As a means of holding the edges of the brake band 15, and the old lining 15ᵃ, in proper position relative to the tool above for detaching the old lining and cutting the old rivet as illustrated in Fig. 3, of the drawings, a second form of anvil block 4ᵈ′, is provided with a shank 4ᵉ, and being provided at its rear edge with an upwardly extending flange or abutment 4ᶠ, extending at right angles to the plane of the base of the block and holding the edges of the brake band and lining in proper position to the cutting or removing tool or chisel carried by the plunger above.

The improved rivet driving and ejecting tool comprises a rivet driving and ejecting stem 16, adapted to be mounted in a suitable tool receiving opening 6ᵇ, in the plunger 6, and to be removably mounted therein by the attaching or locking mechanism hereinafter referred to. The stem 16, is mounted in a relatively fixed position in the plunger and is provided with a relatively movable surrounding sleeve or casing 17. The sleeve 17, comprises a main body portion and a threaded cap 17ᵃ. When the plunger 6, is withdrawn or elevated above a predetermined position the top of the cap 17ᵃ, will engage with the lower edge of the plunger guide head 2ᵃ, thereby projecting the spring finger 17ᵇ, somewhat beyond the dotted line position shown in Fig. 4, to receive the rivet 18, to be driven, and to hold the shank and head portions of the rivets substantially as shown by the dotted lines in Fig. 4, of the drawings and as illustrated in Figs. 1 and 2, of the drawings as the plunger and tool descend to insert the rivet 18, into the rivet opening 15ᵇ, and thereafter to upset the lower end of the rivet on the anvil block 4ᵇ.

A coiled expansion spring 19, surrounds the stem 16, within the casing or sleeve 17, and is interposed between the cap portion 17ᵃ, and the flanged portion 16ᵃ, of the stem to hold the parts and the rivet in proper relative position as the plunger is driven downwardly in the act of inserting the rivet and for permitting relative outward movement of the sleeve when the plunger is retracted as above explained.

As a means of seating the rivet into the cavity beneath the ends of the spring finger 17ᵇ, and the concaved rivet receiving and driving head 16ᵇ, of the stem when the top end of the cap portion 17ᵃ, engages with the fixed guide head 7ᵃ, the fingers are provided at one side with a rivet receiving slot 17ᶜ, to receive the bodies of the rivets, and cross slots 17ᵈ, to receive the heads of the rivets.

As a means of locking or latching the top of the stem 16, within the opening 6ᵇ, of the plunger, the plunger is provided with a small opening 6ᶜ, to receive a latch pin 20, said opening 6ᶜ, terminating in an enlarged opening 6ᵈ, provided with a compression spring 21, the latter being interposed between the threaded plugs 22, and a collar or flange 20ᵃ, on the pin 20, said pin 20, being provided with an extended stem 20ᵇ, extending outwardly through the central opening in the plug 22, and terminating in a handle 20ᶜ, the stem 20ᵇ, being adapted to operate in a slot 2ᶠ, in the plunger guide head 2ᵃ. The stem 16, is provided at its top with a recess 16ᶜ, to be engaged by the spring pressed latch pin 20.

The old brake lining and old rivet cutting and removing tool comprises a chisel head 23, having a shank 23ᵃ, provided with a recess 23ᵇ, to be engaged by the latch pin 20, as shown in Fig. 3, of the drawings. It will be seen that the anvil block 4ᵇ, with the abutment 4ᶠ, serve to hold the edges of the old brake band and lining in proper relative position as the edge of the chisel descends between base part to remove the same and cut the old rivets 15ᶜ.

Having thus described one of the embodiments of our invention, without having attempted to set forth all the forms in which it may be made or all the modes of its use, what we claim and desire to secure by Letters Patent, is,—

1. In a brake reliner, in combination with an anvil, an overhanging guide head, and a vertically movable plunger in the latter; a tool including a rivet driving stem and a split rivet carrying sleeve removably mounted on said plunger in cooperative relation to said anvil, a cooperating anvil block removably mounted on said anvil, and means for operating said plunger and regulating the length of the stroke thereof.

2. In a brake reliner, a rivet driving and ejecting stem, and a spring resisted longitudinally split sleeve surrounding said stem and provided with a recess to receive the shank of the rivet and a cross recess to receive the head of the rivet, said sleeve being provided with spring arms of concavo-convex shape in cross section adapted to initially engage and support the rivet with the head thereof beneath said stem when the latter is elevated and to pass over the stem and the head of the rivet as the latter is driven by said stem.

3. In a machine of the character described, a supporting pedestal, an arm provided with an overhanging guide head and a recessed base detachably mounted on said pedestal, an anvil arm removably mounted in said recessed base and supported on said supporting pedestal, a reciprocatory plunger in said guide head, and a tool in said plunger in cooperative relation to said anvil arm.

4. In a brake reliner, a guide head, a reciprocatory plunger, an anvil in cooperative relation thereto, a rivet driving and ejecting stem carried by said plunger in cooperative relation to said anvil, a surrounding spring resisted sleeve having a limited relative movement on said stem and provided with a rivet head receiving recess at one side and terminating in spring fingers to receive and clamp the shank of the rivet to be driven, said sleeve engaging said guide head when the plunger is elevated to a predetermined position thereby providing a rivet receiving space below said driving and ejecting stem.

5. In a machine of the character described, a rivet driving and ejecting tool comprising a rivet driving and ejecting stem provided near its driving end with a stop flange, a relatively movable surrounding casing thereon, a coiled expansion spring surrounding said stem one end engaging said stop flange and the other engaging and actuating said sleeve, and means for limiting the relative movements of said plunger and sleeve, said sleeve terminating at one end in fingers provided at one side with a rivet receiving slot to receive the shanks of the rivets and cross terminal slots to receive the heads of the rivets.

6. In a machine of the character described, a rivet driving and ejecting stem and a relatively movable sleeve comprising a main body portion and a threaded cap, said cap being provided with an abutment to engage and move the sleeve when the stem is elevated, and said main body portion being longitudinally split forming oppositely arranged spring arms the latter being provided at one side with an intervening slot to receive the shank of the rivet, said intervening slot terminating in a cross recess to receive the head of the rivet, said spring arms being adapted to initially engage and support the rivet with the head thereof beneath said stem when the latter is elevated and to pass over the head of the rivet as the latter is driven by said stem.

7. A brake relining machine, comprising a supporting pedestal, an overhanging arm having a recess base detachably mounted on said pedestal and terminating in a plunger guide head, an anvil arm within said recess base and detachably mounted on said pedestal and extending below said guide head, a reciprocatory plunger in said guide head, a tool in said plunger in cooperative relation to said anvil arm, and lever mechanism connected to and adapted to operate said reciprocatory plunger, said lever mechanism being provided with adjustable links to regulate the length of the stroke of said plunger and tool.

8. In a brake reliner, the combination with an anvil, an overhanging guide head, and a tool carrying plunger; a rivet driving and ejecting stem on said plunger, a coiled expansion spring surrounding said stem and connected to one end thereof, a sleeve surrounding said spring and stem and having a limited movement thereon, said sleeve being provided at one side with a slot and spring fingers at each side of said slot to receive the rivet inserted, said sleeve being also adapted to come into engagement with said guide head when the plunger is elevated to be moved relatively of the rivet driving and ejecting stem to provide a rivet receiving opening below the latter, and means for moving and adjusting the throw imparted to said rivet driving and ejecting stem by said plunger.

In testimony whereof we have affixed our signatures.

ROBERT A. WATERS.
CHRISTIAN V. LUCIUS.